(12) United States Patent
Uehara et al.

(10) Patent No.: US 6,289,162 B1
(45) Date of Patent: Sep. 11, 2001

(54) HIGH-SPEED IMAGE REPRODUCTION METHOD AND APPARATUS

(75) Inventors: Toshihiro Uehara; Keigo Majima, both of Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/178,430

(22) Filed: Oct. 26, 1998

(30) Foreign Application Priority Data

Mar. 17, 1998 (JP) .................................................. 10-066654

(51) Int. Cl.[7] ...................................................... H04N 9/00
(52) U.S. Cl. ................................. 386/1; 386/68; 386/131
(58) Field of Search ............................. 386/1, 6–7, 9–10, 386/44, 78–80, 67–69, 131; 348/441, 449, 459, 700

(56) References Cited

U.S. PATENT DOCUMENTS 5,808,664 * 9/1998 Yamashita et al. ................... 348/700
5,835,163 * 11/1998 Liou et al. ............................ 348/700
5,929,902 * 7/1999 Kwok ..................................... 386/131

* cited by examiner

Primary Examiner—Wendy R. Garber
Assistant Examiner—Christopher Onuaku
(74) Attorney, Agent, or Firm—Antonelli, Terry, Stout & Kraus, LLP

(57) ABSTRACT

A method and apparatus for selectively reproducing and outputting one or several desired fields when effectuating image reproduction at a 2.5-time high speed from a VTR tape that records thereon images of 60 frames/second as converted by the 2–3 pull-down scheme from 24 fields/second images. This apparatus at least includes a frame change detector unit which detects a frame change of the 2–3 pull-down scheme from the significance of a change in luminance level and/or chromaticity level between a reproduced image and its one-field preceding image, a reference field detector unit for detecting, based on a detection span of the frame change detected by the frame change detector unit, a correspondence relation of recording tracks on the VTR tape versus a repeat period or cycle of 2 fields and 3 fields in the 2–3 pull-down scheme, and a storage unit for storing therein the resultant correspondence relation as detected by the reference field detector unit.

9 Claims, 2 Drawing Sheets

FIG.3

| PICTURE | 1 | | 2 | | | 3 | | 4 | | |
|---|---|---|---|---|---|---|---|---|---|---|
| FRAME | 1 | | 2 | | 3 | | 4 | | 5 | |
| FIELD | 1 | 2 | 1 | 2 | 1 | 2 | 1 | 2 | 1 | 2 |
| (a) | ○ | | ○ | | | ○ | | ○ | | |
| (b) | ○ | | | ○ | | ○ | | | ○ | |
| (c) | ○ | | | | ○ | ○ | | | | ○ |
| (d) | | ○ | ○ | | | | ○ | ○ | | |
| (e) | | ○ | | ○ | | | ○ | | ○ | |
| (f) | | ○ | | | ○ | | ○ | | | ○ |

US 6,289,162 B1

HIGH-SPEED IMAGE REPRODUCTION METHOD AND APPARATUS

BACKGROUND OF THE INVENTION

1. Field of the Invention

The present invention relates generally to high-speed reproduction or playback of an image signal recorded on a video tape recorder (VTR) tape through conversion of an image produced at twenty-four (24) frames per second to an image of sixty (60) fields/second. More particularly, but not exclusively, this invention relates to a high-speed image reproduction method and apparatus for reproducing only a specific predefined image or images at an increased speed 2.5 times greater than the standard playback speed, which images are selected from among those of two fields and three fields recording therein a single video frame, respectively.

It should be noted that although in the currently available NTSC standard scheme, the number of successive fields per second in televisions is precisely set at 59.94 (59.94 fields/second) and in a high definition television (HDTV) environment—such as the "High-Vision" system in Japan—the number could be a mixture of 59.94 and 60, these are collectively called the "60 fields/second". Accordingly, it is to be understood that the term "60 fields/second" as will be used herein refers to either 59.94 fields/second or 60 fields/second.

2. Description of the Related Art

Currently, component signals for use in broadcasting and composite signals such as NTSC, PAL or the like are typically subject to interlace (interlaced scanning) processing. In the NTSC system, video frame images are at the rate of 30 pieces per second whereas field images are at 60 pieces/second. Animations and motion pictures are generally photographed and filmed at the rate of 24 frames/second. Accordingly, one prior known approach to record such original images on a VTR tape is to first convert the initial one picture frame into two video fields while converting the next frame to three fields, repeat this procedure consecutively, thereby perform conversion to video images of 60 fields/second by what is called the "two-to-three (2–3) pull-down" technique, and then record them on the VTR tape.

As digital VTRs including "D-2" or "D-3" VTRs, currently available VTRs come with a function of thinning out video fields at constant intervals in conformity with a playback speed when reproducing a video signal from N recording tracks (where "N" is a predetermined natural number) that have been recorded on a tape in a manner corresponding to field images by use of an auto-tracking (AT) head movable in the track width direction in units of N tracks corresponding to the field images, thereby outputting the reproduced video signal.

Considering one exemplary case of high-speed reproduction at an increased speed that is, for example, 2.5 times the standard playback speed—say, 2.5×quick playback—as implemented in the present invention, the above function of the conventional VTRs is achieved by setting the tape feed speed at a value 2.5 times greater than the standard feed speed, and sequentially repeating a playback procedure which includes playing back a field image that essentially consists of N tracks recorded on a tape while thinning out a single field and then thinning out two fields. However, a problem may occur in that one or more picture frames fail to be played back or "skipped" during the high-speed reproduction unless a deeper appreciation is given to the exact relation between one "frame" or "picture" of the original image (i.e. a one-scene picture on motion picture films) and a plurality of video fields of the image signal thus converted.

As noted above, in the conventional VTRs' high-speed or quick playback function, achievability of the 2.5×quick playback does not come without accompanying a penalty—it has been impossible to intentionally select any desired fields. Thus, during reproduction of VTR tapes which record thereon video images through conversion from 24-frames/second images to 60-fields/second ones, it has been impossible, or at least greatly difficult, to select a single field from a group of two successive fields with one picture recorded therein and also one field from a group of three fields recording therein one picture, and then play back only images of such selected fields at high speeds.

SUMMARY OF THE INVENTION

It is therefore an object of the present invention to provide a high-speed image reproduction method and apparatus capable of reconstructing or reproducing, from a VTR tape on which an original image produced at the rate of 24 frames per second has been recorded by conversion using the aforementioned 2–3 pull-down technique into an image of 60 fields/second, only those images of selected fields at a high speed 2.5 times greater than the standard playback speed, the fields including one predefined field selected from a group of two successive fields storing therein a single picture and another specific field as selected from a group of three fields recording a single picture.

To attain the foregoing object the present invention provides a high-speed image reproduction method for reproducing or playing back, from a tape recording thereon an image signal of 60 fields/second as converted from an original image of 24 frames/second, said image signal by use of at least one rotary head, wherein said image signal is generated by combining in a predefined layout a first group including two fields obtained from a single frame of said original image, and a second group including three fields obtained from a single frame of said original image, the method including the steps of: (a) reproducing said image signal in a standard playback mode to detect a frame change of said original image corresponding to said image signal from the magnitude of a change in luminance level and/or chromaticity level between those fields contained in said image signal; (b) detecting, based on the detected frame change, an exact correspondence relationship of the recording tracks on said tape versus the layout of said first and second groups to thereby store the correspondence relationship detected; and (c) performing, while simultaneously letting said tape travel at an increased speed 2.5 times greater than that in the standard playback mode, position-control of said at least one rotary head on the basis of the stored correspondence relation in such a way as to play back only one field image from each of said first and second groups.

The instant invention also provides a high-speed image reproduction apparatus for reproducing from a tape recording thereon an image signal of 60 fields/second recorded thereon through conversion from an original image of 24 frames/second, wherein said image signal is generated by combining in a predefined layout a first group including two fields obtained from a single frame of said original image and a second group including three fields obtained from a single frame of said original image, the apparatus including: first detection means for detecting a change of frames of said original image corresponding to said image signal from the significance of a change in luminance level and/or chromaticity level between fields contained in said image signal as reproduced in the standard playback mode; second detection means for detecting, based on the frame change detected by said first detection means, a correspondence relation between recording tracks on said tape and the layout of said first and second groups; and storage means for storing therein said correspondence relation as detected by said second detection means.

BRIEF DESCRIPTION OF THE DRAWINGS

FIG. 3 is a diagram showing a relation between the original picture and the converted video frames and fields which are reproduced in a high-speed playback mode using the high-speed image reproduction apparatus in accordance with the present invention.

DETAILED DESCRIPTION OF THE PREFERRED EMBODIMENTS

The present invention will be explained in more detail on the basis of embodiments of the invention with reference to the accompanying drawings.

Note here that the term "top field" as will be used herein may refer to a specific field that is positioned at the initial location of each group of two or three successive video fields which is converted from a single frame of the original image, while the term "end field" refers to another specific field that is positioned at the final location of each group of the two or three video fields which is converted from a single frame of the original image.

Figure 1:
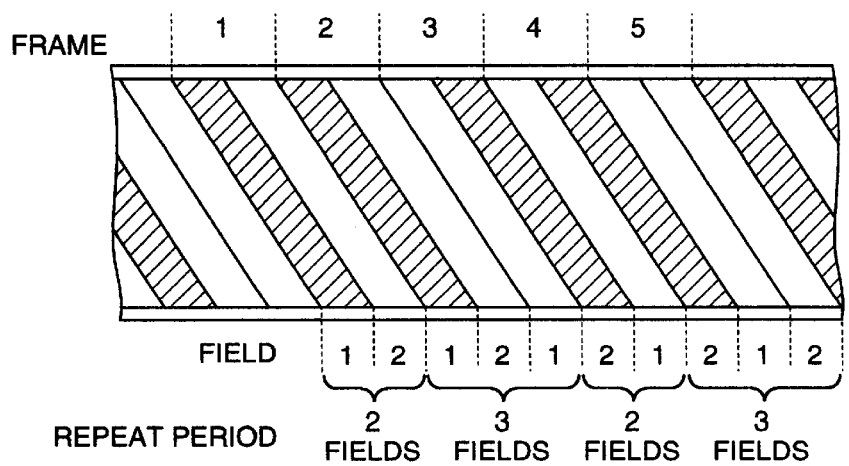
FIG. 1 is a diagram showing a recording pattern of an image on a VTR tape, which image has been converted by 2–3 pull-down techniques.

See FIG. 1, which shows one typical recording pattern of images on a VTR tape, which images have been converted by the "2–3 pull-down" technique stated supra.

In FIG. 1, image signals of a group of two successive video fields are recorded in the recording tracks of first and second fields of a first frame; images signals of a group of the next three fields are recorded in the record tracks of first and second fields of a second frame and a first field of a third frame; image signals of a group of the next two fields are recorded in a record track of a second field of the third frame and a first field of a fourth frame; and images signals of a group of the next three successive fields are recorded in the record tracks of a second field of the fourth frame and first and second fields of a fifth frame. This will be likewise repeated providing the intended recording track pattern with a similar sequence. Note that each recording track hatched with oblique parallel lines in the drawing indicates the above-mentioned "top" field in a group of two or three fields corresponding to one "frame" or "picture" of the original image such as animation or motion-picture films.

Theoretically, the correspondence relation between the frames or pictures of animations or films and video or television fields on a VTR tape is as described above. In the actual implementation, a single field is not always be recorded in one recording track. By way of example, in the case of D-3 VTRs, a single field could be comprised of six (generally, N) record tracks.

The present invention attempts to achieve high-speed reproduction at an increased speed 2.5 times (2.5×) greater than the standard tape travel speed (2.5×quick playback) by selecting only one predefined field from a group of two successive fields recording therein one frame of the original image and then selecting another predefined field from a group of three successive fields recording therein another frame of the original image. For example, certain images of fields are selected each of which has been first recorded after a frame change of the original image occurs (such as the recording tracks with hatching in FIG. 1). To this end, for purposes of consecutively playing back at high speeds only those record tracks hatched in FIG. 1 by use of one or more auto-tracking (AT) head of the D-3 VTR while "thinning out" those tracks each recording an identical image therein, it is required that a correspondence relation between recording tracks and a period or cycle of their repetitive layout be accurately predicted by finding out as a reference field either the initial field or the final field in the period of repetitive layout of the two-field group or three-field group into which an identical original image has been converted, and then, progressively play back only those record tracks in which desired fields have been recorded.

Figure 2:
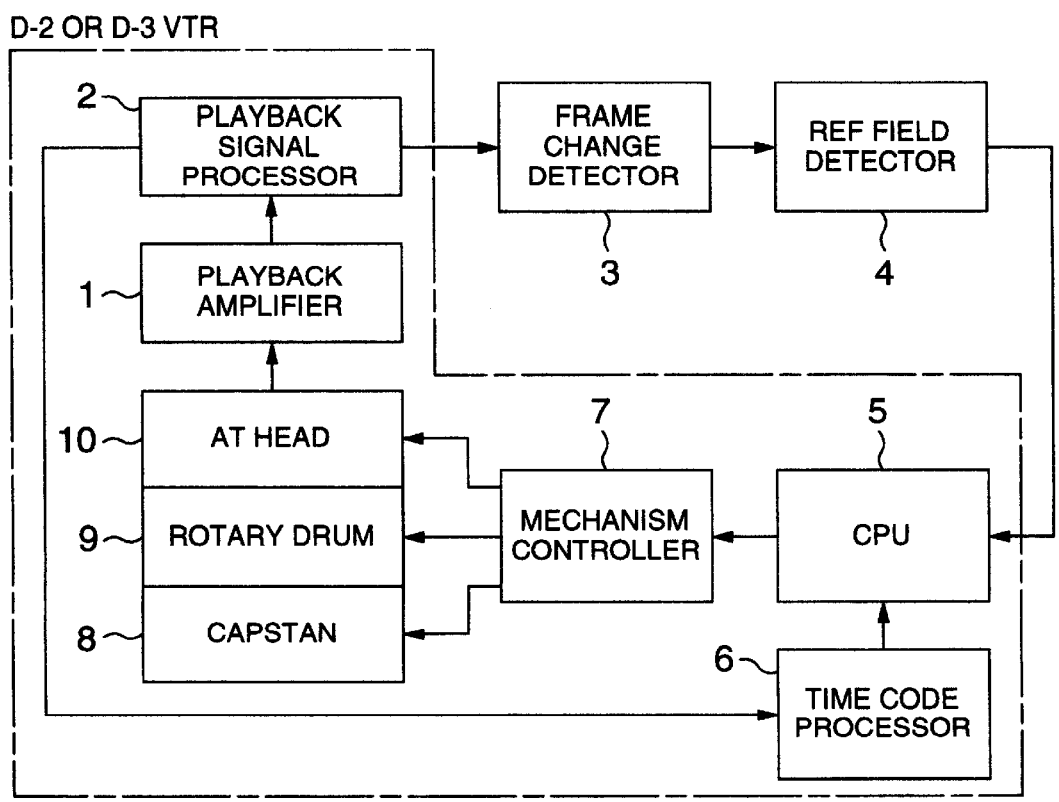
FIG. 2 is a block diagram depicting one preferred embodiment of the high-speed image reproduction apparatus in accordance with the present invention.

FIG. 2 is a block diagram depicting one preferred embodiment of the high-speed image reproduction apparatus in accordance with the present invention, which is operable to sequentially play back only those selected tracks in which desired fields have been recorded thereby effecting quick playback as a whole.

In FIG. 2, the reference numeral 1 designates a playback amplifier; numeral 2 denotes a playback signal processing section; 3 indicates a frame-change detector; 4, a reference field detector; 5, a CPU; 6, a time-code processing section; 7, a mechanism control section; 8, a tape drive section which may typically be a capstan; 9, a rotary drum; 10, an AT head assembly. Note that in the drawing, a system block or module as indicated by a dash-and-dot line is the part that corresponds to either a D-2 VTR or D-3 VTR employing the AT head(s).

An explanation will next be given of an operation of this apparatus.

In the illustrative embodiment, the VTR is first set in its standard constant-speed playback mode for video reproduction (without varying the tape feed speed), whereby the playback amplifier 1 operates to electrically amplify a head playback signal as reproduced from a VTR tape used, which signal is then supplied to the playback signal processing section 2. In the reproduction signal processor 2 the head playback signal thus amplified is used to produce a VTR output image signal, which in turn is supplied to the frame change detector 3—this is newly added to the currently available constituent parts or components of the VTR in accordance with the principles of this invention.

The frame change detector 3 operates to compare in luminance level and chromaticity level an input image signal presently being supplied to this detector with its preceding image signal that must occur immediately before the input image signal. The comparison is made in units of picture elements or "pixels" by way of example. If the total sum of resultant difference components detected goes beyond a preset threshold value, then it is determined that a frame change has occurred. A certain field that has first been recorded after occurrence of such frame change is detected as the "top" field, and then, a signal indicative of a field count value in such detection event is supplied, as positional information (time-related position information) of the "top" field, to the reference field detector 4 which is newly added in accordance with the invention. Alternatively, a field that has been recorded just before occurrence of a frame change may be detected as the "end" field thereby allowing its position information to be supplied to the reference field detector 4. Additionally, the objects under comparison in comparing a present input image signal with the immediately preceding field image signal may be only one of the luminance level and the chrominance level. Further, comparison results of the both may also be summed together with weighting applied thereto. Still alternatively, the comparison could be done in units of blocks each having a fixed size. optionally, the frame change detector 3 may be one of presently available scene change detectors well known among those skilled in the art with its inherent motion compensation features rendered inoperative.

At the reference field detector 4, this provides prediction of the first field of the repeat period of the two-field group and the three-field group in the 2–3 pull-down scheme in a way as follows. Supposing that a present "top" field is the n-th field, employ as the reference field the present "top" field when the next "top" field is the (n+2)th field. Alternatively, assuming that a present "top" field is the n-th field, if the next "top" field is the (n+3)th field then use the (n+3)th field as the reference field. A similar procedure is employable when predicting the final field of the on-tape track repeat period.

The field count of such first or final field thus sequentially detected is supplied to the CPU 5 as the positional information (time-related position information) of the reference field. On the other hand, the time code processor 6 plays back from the VTR tape a time code which is then supplied to the CPU 5. In cases where the repeat sequence of the position information of the reference field as supplied from the reference field detector 4 comes continuously to the extent that it exceeds a predefined number, the CPU 5 provides an indication of correspondence between the following repeat sequence and the time code on the VTR tape, and then stores such relation in a memory (not shown) operatively associated therewith. Whereby, there is defined on a one-to-one correspondence basis the position of either the first or final field in the repeat sequence of the time code and the images recorded on the tape. Note that employment of the arrangement for detecting the repeat sequence for a predetermined number of times is to increase the reliability of prediction.

Next, the CPU 5 generates and issues a command to the mechanism controller 7 to increase the VTR's tape feed speed so that it is 2.5 times the standard speed. Then, predict one or more tracks to be reproduced on the basis of both the correspondence relation between the time code presently being stored in the associative memory of the CPU 5 and the first or final field of the repeat sequence, and time code signal input at the speed 2.5 times greater than the standard speed. Thereafter, such predicted position information (time-related position information) is supplied to the mechanism controller 7, which information is accompanied with playback phase of the time code signal, capstan phase, rotary drum phase and AT head predicted position information (time-related position information) using AT head position as a parameter.

The recording tracks to be played back in this case may sufficiently be one or more track which records therein either one of the two fields corresponding to one frame of the original image or one or more track which records any one of the three fields corresponding to another frame of the original image, wherein an appropriate way of selecting which one of them may be determined when reduction to practice of the principles of the invention.

The mechanism controller 7 is responsive to receipt of the predicted position information supplied from the CPU 5, for generating several control signals to ensure attainment of the intended consecutive tracking of only the selected recording tracks of a corresponding field, e.g. six record tracks (because one field consists of six recording tracks), which control signals are supplied to the VTR's capstan 8 that is operable to control the tape travel speed (tape phase), the rotary drum 9 for control of the drum's rotation speed and drum rotation phase, and the AT head 10 controlling the amount of movement of the playback head in the track width direction, respectively. In responding to the generated control signals, the tape phase is controlled by controlling a voltage applied to a motor that drives the capstan 8, the drum rotation speed and the drum rotation phase are controlled by controlling a voltage to a motor for use in driving the rotary drum 9, and the AT head position in the track width direction (spatial position) is controlled by controlling a voltage to a piezoelectric element or device used for driving the AT head 10.

With such an arrangement noted above, it becomes possible to achieve the intended high-speed playback or reproduction at the speed 2.5 times faster than the standard tape travel speed while selecting only those images of a single predefined field of the two fields recording therein a single frame and also of one predefined field of the three fields recording one frame. Lastly, the relation of one-scene pictures on movie films to be played back for visual indication versus video frames along with fields upon effectuation of such high-speed reproduction is summarized in FIG. 3. FIG. 3 shows one typical combination of the to-be-reproduced fields with respect to ten fields which serve as a minimal repeat unit or "segment" when taking account of the relation among the pictures and video frames plus fields, wherein either one of the fields (a)–(f) is selected depending on what strategy is used to define the to-be-selected field of each of the two fields recording a single picture frame and that of the three fields recording one picture frame, thus permitting selective playback of the images of specific fields with empty circle marks "○" adhered thereto as shown in FIG. 3.

Although in the foregoing description the principles of the present invention have been explained in conjunction with specific embodiments applied to a digital VTR such as the D-3 VTR, it would be appreciated to a person skilled in the art that this invention is also applicable to analog VTRs. It would also be appreciated to experts that the recording tracks constituting a single video field may be modified in number as necessary (in D-3 VTR a single field consists of six record tracks).

According to the present invention, it is possible to accomplish high-speed reproduction at the speed 2.5 times greater than the standard speed (2.5×quick playback) by selecting only the image of a single predefined video field of two successive fields that record a complete picture and also the image of one predefined field of three successive fields recording one picture from those images which have been recorded on a VTR tape after conversion of the images as created at the rate of 24 frames/second on animation or movie films into 60 fields/second images.

What is claimed is:

1. A method of reproducing, from a tape recording thereon an image signal of 60 fields per second as converted from an original image of 24 frames/second, said image signal by use of at least one rotary head, said image signal being generated by combining in a predefined layout a first group including two fields obtained from a single frame of said original image, and a second group including three fields obtained from a single frame of said original image, said method comprising the steps of:

(a) reproducing said image signal in a standard playback mode to detect a frame change of said original image corresponding to said image signal from a significance of a change in luminance level and/or chromaticity level between fields as contained in said image signal;

(b) detecting based on the detected frame change a correspondence relation between recording tracks on said tape and the layout of said first and second groups to store the correspondence relation detected; and (c) performing, while causing said tape to travel at a speed 2.5 times greater than that in a standard playback mode, positioning-control of said at least one rotary head on the basis of the stored correspondence relation in such a way as to reproduce only a single field image from each of said first and second groups.

2. The method according to claim 1, wherein each of the fields contained in said image signal is dividedly recorded in N tracks, where N is a positive integer; and said step (c) includes position-controlling said at least one rotary head in a track width direction thereby letting the rotary head trace only N tracks storing one field recorded therein with respect to each of said first and second groups.

3. The method according to claim 1, wherein said step (b) includes detecting the correspondence relation between the recording tracks and a reference field on said tape by using, where a field immediately after the detected frame change is regarded as a top field, an n-th field as the reference field when the n-th field and (n+2)th field correspond to said top field, and, when the n-th field and (n+3)th field correspond to said top field, then regarding the (n+3)th field as the reference field.

4. The method according to claim 1, wherein said step (b) includes detecting the correspondence relation between the recording tracks and a reference field on said tape by using, where a field immediately after the detected frame change is deemed as an end field, an n-th field as the reference field when the n-th field and (n+2)th field correspond to said end field, and, when the n-th field and (n+3)th field correspond to said top field, then regarding the (n+3)th field as the reference field.

5. An apparatus for reproducing an image signal of 60 fields/second recorded on a tape, said image signal being converted from an original image of 24 frames/second and generated by combining in a predefined layout a first group including two fields obtained from a single frame of said original image and a second group including three fields as obtained from a single frame of said original image, said apparatus comprising:

at least one rotary head positionally controllable in a track width direction for reproduction of a signal recorded on said tape;

a rotatable drum mounting thereon said at least one rotary head for causing said at least one rotary head to slide relative to said tape;

a tape drive section for allowing said tape to travel at a designated speed;

a control section for controlling said at least one rotary head and said rotatable drum as well as said tape drive section;

a playback signal processing section for processing a signal reproduced by said at least one rotary head to play back said image signal;

a first detector for detecting a frame change of said original image corresponding to said image signal from a significance of a change in luminance level and/or chromaticity level between fields contained in said image signal as output from said playback signal processing section;

a second detector for detecting as a reference field any one of an initial field and a final field in one period of said first and second groups on the basis of the frame change as detected by said first detector;

a time-code processing section for reproducing and outputting a time code signal stored on said tape; and a CPU for predicting and storing a correspondence relation between recording tracks and a period of the layout of said first and second groups by letting positional information of the reference field detected by said second detector be related to a time code as output from said time-code processing section, for predicting, when said tape is travelling at a speed 2.5 times greater than that in a standard playback mode, more than one track to be reproduced on the basis of the stored correspondence relation and the time code signal reproduced from said tape, and for outputting information concerning a predicted track or tracks to said control section.

6. The apparatus according to claim 5, wherein said first detector is operable to obtain a comparison output by comparing an image signal of one field contained in said image signal outputted from said playback signal processing section with a one-field preceding image signal, and determine when its comparison output is beyond a predetermined value that a frame of said original image corresponding to said image signal has changed.

7. The apparatus according to claim 5, wherein each of the fields contained in said image signal is separately recorded in N tracks, where N is a positive integer, and said CPU outputs information enabling said at least one rotary head to trace only N tracks recording thereon a single field with respect to each of said first and second groups.

8. The apparatus according to claim 5, wherein said second detector detects said reference field by using, where a field immediately after the detected frame change is a top field, an n-th field as said reference field when the n-th field and (n+2)th field correspond to said top field, and, when the n-th field and (n+3)th field correspond to said top field, then regarding the (n+3)th field as said reference field.

9. The apparatus according to claim 5, wherein said second detector detects said reference field by using, where a field immediately after the detected frame change is an end field, an n-th field as said reference field when the n-th field and (n+2)th field correspond to said end field, and, when the n-th field and (n+3)th field correspond to said end field, then regarding the (n+3)th field as said reference field.

* * * * *